United States Patent [19]

De Long

[11] 4,273,833

[45] * Jun. 16, 1981

[54] ANTI-FOULING OVERCOATING COMPOSITION AND USE THEREOF

[75] Inventor: Charles F. De Long, Washington, D.C.

[73] Assignee: United States Trading International, Inc., Washington, D.C.

[*] Notice: The portion of the term of this patent subsequent to Apr. 4, 1995, has been disclaimed.

[21] Appl. No.: 891,837

[22] Filed: Mar. 30, 1978

Related U.S. Application Data

[63] Continuation-in-part of Ser. No. 614,927, Sep. 19, 1975, Pat. No. 4,082,884.

[51] Int. Cl.³ ............................................. B05D 3/02
[52] U.S. Cl. .............................. 428/411; 106/18.32; 260/29.6 NR; 427/379; 427/409; 428/469; 428/463; 428/518; 428/520; 428/522; 427/372.2; 427/393.5
[58] Field of Search ............... 260/29.6 NR, 29.6 N; 106/15 R; 424/59, 60; 428/411

[56] References Cited

U.S. PATENT DOCUMENTS

| | | | |
|---|---|---|---|
| 2,954,358 | 9/1960 | Hurwitz | 260/42.28 |
| 3,215,725 | 11/1965 | Strobel | 424/60 |
| 3,496,134 | 2/1970 | Di Giaimo | 260/45.85 V |
| 3,786,113 | 1/1974 | Vassileff | 260/830 R |
| 3,821,145 | 6/1974 | Walus | 260/29.4 VA |
| 3,904,569 | 9/1975 | Hekal | 260/29.6 N |
| 4,012,261 | 3/1977 | Sidi | 106/15 R |
| 4,026,712 | 5/1977 | Drury | 106/15 R |

FOREIGN PATENT DOCUMENTS

2165881 10/1973 France .

Primary Examiner—Paul R. Michl
Attorney, Agent, or Firm—Le Blanc, Nolan, Shur & Nies

[57] ABSTRACT

An anti-fouling overcoating composition for watercraft or stationary underwater structures precoated with hard-surface leaching-type anti-fouling paint consists essentially of an aqueous solution or dispersion of a carboxylated hydrophilic acrylic copolymer, a cross-linking agent for the carboxylated hydrophilic copolymer, a polyalkylenepolyamine or a hydrophilic polyalkylenepolyamine derivative and an effective amount of an ultraviolet-absorbing agent.

20 Claims; No Drawings

ANTI-FOULING OVERCOATING COMPOSITION AND USE THEREOF

REFERENCE TO RELATED APPLICATION

This is a continuation-in-part of De Long, Ser. No. 614,927, filed Sept. 19, 1975, now U.S. Pat. No. 4,082,884.

BACKGROUND OF THE INVENTION

This invention relates to an anti-fouling overcoating composition for watercraft and underwater portions of marine structures precoated with a hard-surface leaching-type anti-fouling paint and to a method for reducing fouling and, secondarily, reducing or minimizing drag created in fluid passing along the surfaces of underwater structures, whether movable or stationary.

Marine fouling organisms, such as crustaceans (barnacles, Conchodermae), mollusks (boring worms and boring clams), annelids (tubeworms, Serpulidae), tunicates, algae, coelenterates, acorn shells (Balonidae), goose mussels (Lepodoids), and moss (Hydroidae) grow and accumulate on surfaces in an underwater environment. Wooden structures are particularly susceptible to attack by pileworms or shipworms (Teredinidae), limnoria, martesia, sphaeroma and the like. Metal water intake pipes for cooling towers in thermoelectric power stations, petrochemical factories of the like are commonly infested with and fouled by adherence of Blue mussel, sessile acorn barnacles (Balanus), oysters, moss (Bryozoa), Hydrozoa and the like.

Approaches to prevention of a marine fouling have included the use of silicone resins, as disclosed by Mueller et al (U.S. Pat. No. 3,702,778); the use of asphaltic bitumen compositions as recited by Rudd (U.S. Pat. No. 2,489,228) and compositions containing antifoulant in a hydrophilic polymer derived from a hydroxyalky acrylic polymer (Shepherd et al U.S. Pat. Nos. 3,990,381; 3,896,753; and 3,575,123).

Vassileff (U.S. Pat. No. 3,786,113) indicates that polymer compositions having selective permeability for gas and water vapors are obtained by mixing a polyacrylic resin and polyethylenimine, in 5:1 to 2:1 weight ratio, and cross-linking the resulting mixture.

Merlino et al (U.S. Pat. No. 3,702,349) employ the reaction product of a polyaziridinyl adduct and a co-reactant containing carboxy or other functional groups in an organic solvent-based coating material.

Walus (U.S. Pat. No. 3,821,145) describes an aqueous coating composition of an acrylic polymer containing hydroxyacrylate or acrylic acid units and a water-dispersible methylolated melamine resin.

Hurwitz (U.S. Pat. No. 2,954,358) discloses aqueous compositions comprising a water-soluble or readily water-dispersible polyepoxide and a water-insoluble polymer containing 1–10 mole percent of acrylic or methacrylic acid monomer units. The use of amine, including polyalkylenepolyamines, in small amounts as a catalyst for the cross-linking reaction between the epoxide function and the acid function is set forth.

Blank (U.S. Pat. No. 3,959,237) discloses the use of a film-forming copolymer containing 20–60 parts of acrylic or methacrylic acid, at least partially neutralized by multivalent cations, as a carrier for agricultural fine chemicals. Ethylenimine is disclosed as neutralizing agent.

"Fouling" can be defined as assemblages of marine animals and plants which grow on watercraft and underwater marine structures, as well as on rocks, stones and other natural objects. Marine fouling is a result of growth of marine animals and plants on the exposed surfaces of man-made marine structures, including bottoms and hulls of ships, pier supports, buoys, water-intake pipes, fishing nets, rowboats, water skis, ocean liners, tankers and other cargo ships, submarines, pilings, bridge substructures and the like. Marine fouling is an omnipresent problem, occurring whether the underwater surface is made from wood, metal, plastic, fiberglass, concrete or other structural material.

Fouling is economically harmful to the shipping industry because of the accompanying decrease in the speed of watercraft, resulting in higher power consumption and operating costs to maintain schedules, and because of the need to bring ships into drydock to remove the fouling and apply fresh paint. Furthermore, fouling can produce physical damage to watercraft or stationary underwater structures, resulting in shortened useful life and the need for frequent replacement. In the case of fishing nets, fouling causes an increase in the fluid resistance to water flowing therethrough, so that fish growing in a limited area, as is typical of areas of cultivation, are adversely affected by a poor supply of oxygen in the water.

Attempts to control fouling by marine organisms generally have been based on the use of chemicals which are toxic to a specific organism or group of organisms. Thus, creosote has been used for the impregnation of wooden surfaces. However, creosote is unsatisfactory for painted surfaces, for the reason that creosote bleeds through the paint.

A variety of anti-fouling agents have been developed which are toxic to deleterious marine organisms. Typical of these agents are cuprous oxide, mercury oxide or the like; organocopper salts, e.g., copper naphthenate, copper oleate, etc.; organotin compounds, e.g., bis-tributyltin oxide, triphenyltin bromide, dibutylethyltin bromide; 1,2,3-trichloro-4,6-dinitrobenzene; dichlorodi-phenyldichloroethane; nitrodiphenyl ether derivatives; organolead compounds, e.g., triphenyllead stearate, triphenyl lead chloride; 10,10'-oxybisphenoxazine (SA-6 546); hexachlorophene and tetrachloroisoph-thalonitrile, alone or in combination. However, most of these materials are highly toxic to other organisms and tend to leach out of the coating in which they are applied so that the coating composition becomes ineffective in preventing fouling after a period of time. Often, compositions containing these materials are difficult to apply to marine structures for lack of adequate adhesion or tend to peel from the structure after an unsatisfactorily short interval.

It is therefore apparent that there is a continuing need for anti-fouling systems which adhere tenaciously to the surface treated therewith, operate efficiently as anti-foulants over a prolonged period of time and are not highly toxic to desirable forms of marine life.

SUMMARY OF THE INVENTION

It has been found, in accordance with this invention, that an anti-fouling overcoating composition for watercraft or stationary underwater structures precoated with hard-surface leaching-type anti-fouling paint consists essentially of an aqueous solution or dispersion of a carboxylated hydrophilic acrylic copolymer, a cross-linking agent for the carboxylated hydrophilic copolymer, a polyalkylenepolyamine or a hydrophilic polyalkylenepolyamine derivative and an effective amount of an ultraviolet-absorbing agent.

In one embodiment of this invention, a method of reducing the fouling tendency of watercraft and stationary underwater structures consists of applying below the waterline of the pre-coated craft or structure an anti-fouling overcoating composition containing a higher polyalkylenepolyamine or hydrophilic derivative thereof. In another embodiment, a marine structure protected against fouling by marine organisms consists of a watercraft or stationary marine structure precoated with hard-surface leaching-type anti-fouling paint and overcoated below the water line with the anti-fouling overcoating composition, which contains a higher polyalkylenepolyamine or a hydrophilic derivative thereof.

The coatings of this invention are protective glaze coatings for painted surfaces, especially on watercraft painted below the water line with hard-surface leaching-type anti-fouling paint and on other structured surfaces subjected to water exposure, such as underwater support and pipeline intake structures for piers, docks, bridges and oil drilling rigs. The compositions of this invention are thought to function by providing protection against ultraviolet rays of the sun which break down the vehicle and pigments in conventional anti-fouling paint formulations. Such damage usually occurs down to about four feet below the water line.

In the case of underwater structures or other constructions not exposed to sunlight or ultraviolet light; e.g., boilers, water tanks, evaporators, engine blocks, water intake and outflow lines, the structure or construction precoated as above can be protected from fouling by application of an overcoating containing no ultraviolet absorber. A structure can be protected against the corrosive action of saline or brackish water by application of the coating as above to a clean surface.

It has been found that the compositions of this invention, when applied on the precoated underwater portion of a watercraft or stationary marine structure and permitted to dry provide a coating which provides prolonged anti-fouling activity and, secondarily, decreases the drag of water on the craft. The coating composition further increases the useful life of the undercoating on the watercraft or underwater structure.

DETAILED DESCRIPTION

As used in the specification and claims, "carboxylated hydrophilic acrylic copolymer" means any copolymer which contains at least some carboxylic acid groups introduced by polymerization of an alpha,beta-unsaturated acid. Examples of alpha,beta-unsaturated acids for the purposes of this invention include acrylic acid, methacrylic acid, itaconic acid, crotonic acid, maleic acid, citraconic acid, ethacrylic acid and the like. Acrylic acid is preferred.

Monomers usable in the preparation of the carboxylated hydrophilic copolymers of this invention include lower alkyl acrylate and methacrylate esters and monomers polymerizable therewith, including, but not limited to styrene, vinyl acetate, ethyl vinyl ether, substituted styrenes, and the like. However, hydrophilic carboxylated copolymers prepared from lower alkyl acrylate and methacrylates and carboxylic monomer exclusively are preferred. Typical of the esters preferred for making the carboxylated hydrophilic copolymers are the $C_1$-$C_4$ alkyl acrylates and methacrylates, such as methyl acrylate, ethyl acrylate, n-propyl acrylate, isopropyl acrylate, the butyl acrylates and the corresponding methacrylates. Especially preferred monomers are methyl methacrylate, ethyl methacrylate, butyl acrylate, ethyl acrylate, methyl acrylate and mixtures thereof, particularly with from about 5% to about 20% by weight of acrylic acid monomer.

A composition particularly preferred for the purposes of this invention consists of a copolymer based on about 56% by weight of methyl methacrylate, about 30% by weight of ethyl methacrylate and about 14% by weight of acrylic acid. An equally preferred composition is based on about 44% by weight of butyl acrylate, 40% by weight of methyl acrylate and about 16% by weight of acrylic acid. Also preferred is a polymer containing about 90% by weight of ethyl acrylate and about 10% by weight of acrylic acid units.

Copolymers used in the compositions of this invention can be made as disclosed, for example, by Uelzmann (U.S. Pat. No. 2,904,526), Conrady et al (U.S. Pat. No. 3,590,118) or Stockman (U.S. Pat. No. 3,699,067), herein incorporated by reference.

For ease of application, the copolymer or terpolymer is preferably solubilized in water by adjustment of the pH to 8 or higher. Suitable materials for adjustment of the pH include sodium hydroxide, ammonium hydroxide, potassium hydroxide and organic amines, including but not limited to dimethylamine, diisopropylamine, morpholine, triethylamine, ethylenediamine, 2-methylpiperazine, monoamylamine, dibutylamine, 2-amino-2-methyl-1,3-propanediol, and the like. Of the foregoing, ammonium hydroxide and diisopropylamine are preferred.

If an organic solvent is to be used, it is added to the alkaline dispersion of polymer. The polyalkyline polyamine is next added and then the ultraviolet aborber, when used.

The molecular weight of the copolymer or terpolymer prior to cross-linking can vary between about 5000 and three million. Preferably, the molecular weight is between about 10,000 and 100,000. Although it is difficult to determine the molecular weight of the product after cross-linking, it is thought generally to be up to one million or higher.

Cross-linking agents suitable for the purposes of this invention include difunctional materials which react with the carboxyl groups of the hydrophilic acrylic copolymers used herein. Exemplary of cross-linking agents which convert the hydrophilic copolymers of this invention to essentially permanent overcoating compositions are formaldehyde condensation resins, epoxy compounds and multivalent metal ions. Formaldehyde resins include those based on melamine, such as the methylol melamines and the lower molecular weight melamine-formaldehyde resins as well as methylolated phenols and lower molecular weight phenol-formaldehyde resins. Epoxy compound include diglycidyl and triglycidyl ethers and low molecular weight epoxy resins or diepoxide ethers of epoxide equivalents between 174 and 2000. Typical of multivalent metal ions which can be used are zinc, chromium, aluminum, iron, calcium, and titanium, in the form of salts, oxides or hydroxides.

Among commercially available formaldehyde resins which can be used as cross-linking agents are melamine-formaldehyde resins such as Resimene ® RF 5306 (Monsanto Chemical Co.) and Cymel ® 300 (American Cyanamid Co.). Melamine-formaldehyde resins and methylolated melamine derivatives are among the cross-linking agents preferred for the practice of this invention.

Commercially available epoxy compounds for the purposes of this invention include Epon ® 828 (Shell Chemical Co.), the diglycidyl ether derived from epichlorohydrin and bisphenol A; Epon ® 812 (Shell Chemical Co.), the triglycidyl ether of glycerol; Eponite ® 100 (Shell Chemical Co.), a water-dispersible epoxy resin; and DER 332 (Dow Chemical Co.), as disclosed by Smith et al (U.S. Pat. No. 3,240,376), incorporated herein by reference. Preferred epoxy compounds are the diglycidyl and triglycidyl ethers, especially bisphenol A diglycidyl ether and glycerine triglycidyl ether.

Although a variety of metallic ions can be used to provide cross-linking, the preferred system is one in which the cross-linking agent is zinc ions. A convenient way of preparing materials using zinc ions as cross-linking agent is to use a solution of zinc ammonium carbonate complex, which is added to the solution or dispersion of copolymer.

The amount of cross-linking agent can be varied from about 0.1% to about 20% by weight (as solids) of hydrophilic acrylic copolymer. Preferably the amount of cross-linking agent is from about 0.1% to about 5% by weight of the hydrophilic acrylic resin.

Although the compositions prepared according to this invention ultimately become cross-linked and adhere permanently to the watercraft or stationary marine structure being overcoated, it will be understood that the compositions used according to this invention have a reasonable life, provided that the hydrophilic acrylic resins and cross-linking agent are mixed at the site of application. Thus, a system consisting of a carboxylated acrylic terpolymer and a glycidyl ether has a life of about six days at room temperature, so that compositions for the practice of this invention can be prepared several days before use. Compositions using melamine-formaldehyde resins as the cross-linking agent have an apparently indefinite shelf life. Preferably, however, the hydrophilic acrylic resin and cross-linking agent are mixed just prior to use so that the products are of low viscosity for ease of application.

"Ultraviolet-absorbing agent," as used in the specification and claims, means a material which is compatible with the carboxylated hydrophilic acrylic polymer and cross-linking agent and which absorbs incident radiation in the range between about 2700 Å and about 4000 Å. Among materials known to function as ultraviolet-absorbing agents are coumarin ethers; esters of para-aminobenzoic acid, such as the glyceryl ester; esters of substituted para-aminobenzoic acids and para-methoxycinnamic acid, e.g., the 2-ethoxyethyl ester; benzophenone derivatives, e.g., 2-hydroxy-4-methoxybenzophenone; triazolylketones, such as 2-phenyl-4-(2',4'-dihydroxybenzoyl)-v-triazoles and the corresponding ethers and esters; hydrazones derived from aromatic aldehydes; 2-phenylbenzoxazole derivatives; bisoxalic acid diamides; benzoylbenzofuran derivatives; formazan derivatives and metal chelates of bicyclonoanedione esters; bis-alpha-cyano-beta,beta-diphenylacrylic acid derivatives; 2-aryl-4,5-arylo-1,2,3-triazoles; beta-benzoyloxy-2'-hydroxychalcones and the like.

The preferred ultraviolet-absorbing materials used in accordance with this invention are those which absorb from about 2700 Å to about 3300 Å. Among compounds which absorb selectively in this more limited region are benzoylbenzofurans (Baron et al., U.S. Pat. No. 3,448,190), which absorb primarily from about 2900 Å to about 3200 Å and various cinnamate esters, which absorb from about 2700 Å to about 3300 Å. Particularly preferred as an ultraviolet-absorber is 2-ethoxyethyl p-methoxycinnamate, available under the trade name of Giv-Tan ® F from Sindar Division of Givaudan Corp., Clifton, N.J.

The effective amount of ultraviolet-absorbing agent is from about 0.3% to about 7.5% by weight of the solution or dispersion. However, the preferred range is from about 0.5% to about 5.0% by weight of the solution or dispersion.

"Polyalkylenepolyamine and hydrophilic polyalkylenepolyamine derivative", as used in the specification and claims, include polyethylenimine and higher polyalkylenepolyamines and hydrophilic derivatives thereof.

"Polyethylenimine or hydrophilic polyethylenimine derivative" includes derivatives of materials which can vary in molecular weight from about 1,000 to about 100,000. Hydrophilic polyethylenimine derivatives within the scope of this definition include hydroxyethylated polyethylenimine, which is the reaction product of polyethylenimine with ethylene oxide; propoxylated polyethylenimine, which is the reaction product of polyethylenimine with propylene oxide; epichlorohydrin modified polyethylenimine and urea-modified polyethylenimine. Generally, a weight ratio of 1:1 to 1:0.1 of polyethylenimine to ethylene oxide is preferred; for propylene oxide, 1:0.1 to 1:1.1; for epichlorohydrin about 1:1 and for urea about 1:1. Preferably, polyethylenimine or hydrophilic polyethylenimime derivatives used in the practice of this invention have a molecular weight from 1,000 to about 60,000, most preferably from about 40,000 to about 80,000. Mixtures of polyethylenimine (PEI) and hydroxyethyl-PEI can be used and are preferred, particularly at ratios of 10:1 to 1:10.

Polyethylenimine can be purchased from BASF under the trade designation Polymin P ®, which is an aqueous solution of high molecular weight PEI (about 50% active) having a Brookfield viscosity of 10,000–20,000 cP at 20° C. and 20 r.p.m.

Another commercially available type of PEI is EPOMIN P-1000 (Sea-Horse Brand, Nippon Shokubai Kagaku Kogyo Co., Ltd.; Higashiku, Osaka), which is an aqueous solution about 30% real having a molecular weight $\overline{M}_n$ of 60,000–80,000 and a Brookfield viscosity of 400–900 cP at 25° C. and 60 r.p.m.

PEI was available from the Dow Chemical Co., Midland, Michigan. The product designated as PEI 600 has a molecular weight of about 40,000–60,000.

Any of the commercially available PEI can be modified as set forth above to give hydrophilic derivatives. Ethoxylated PEI, designated below as PEI-600 E, can be bought from the Southwest Specialty Chemical Co. (P.O. Box 759, Deer Park, Texas 77536)

Higher polyalkylenepolyamines include polyalkylenimines (PAI) and polyalkylenepolyamines (PAPA) of 3–5 carbon atoms in the alkylene.

The polymerization of such alkylenimines has been reviewed in Jones, "The Polymerization of Olefin Amines," in P. H. Plesch, ed., The Chemistry of Cationic Polymerization, New York, MacMillan (1963), pages 521-534. PAI's disclosed by Jones include the polymers of 2-methylethylenimine, 2-ethylethylenimine, cis-2,3-dimethylethylenimine, trans-2,3-dimethylethylenimine, 2,2-dimethylethylenimine, and the like.

In addition, branched polyalkylenepolyamines are operable for the practice of this invention. PAPA's may be prepared, for example, by further polymerizing an alkylenepolyamine, such as ethylenediamine, diethylenetriamine, triethylenetetramine, tetraethylenepentamine, or pentaethylenehexamine, by a condensation raction with a difunctional organic compound, such as a dihaloalkane, e.g., 1,2-dichloroethane. It will be appreciated that PAPA's have the same empirical formulas as the corresponding PAI's.

The weight ratio of polyalkylenepolyamine or hydrophilic polyalkylenepolyamine derivative in the compositions of this invention to carboxylated hydrophilic acrylic polymers is preferably varied from about 10:1 to about 0.5:1.

The combination of carboxylated hydrophilic acrylic polymer and polyalkylenepolyamine or hydrophilic polyalkylenepolyamine derivative constitutes from about 5% to about 50% by weight of the solutions or dispersions of this invention, but preferably the combination is between about 5% and about 30% by weight.

The amount of cross-linking agent can be varied from about 0.1% to about 10% by weight of the aqueous solution or dispersion, but a level of from about 0.1% to about 2.5% by weight is preferred.

In the compositions of this invention the weight ratio of hydrophilic acrylic copolymer to polyalkylenepolyamine is thus about 3 or less, i.e., from 2:1 to 0.1:1 and the ratio of cross-linking agent to polyalkylenepolyamine is 1:0.33 to 1:0.02. Therefore, the ratios are:

hydrophilic polymer—3–0.1
polyalkylenepolyamine—1
cross-linking agent—0.33–0.02

Most preferably, the ratio of hydrophilic acrylic copolymer to polyalkylenepolyamine is between 2:1 and 0.5:1 and of cross-linking agent to polyalkylenepolyamine between 1:15 and 1:0.02. That is, most preferred ratios are:

hydrophilic polymer—2.0–0.5
polyalkylenepolyamine—1
cross-linking agent—0.15–0.02

Optionally, the compositions of this invention can also contain one or more of the anti-fouling agents described above.

Coatings of the polymeric compositions of the invention may be applied by any conventional technique, including spraying, brushing, doctor blade application, and the like. Air drying is effective, although elevated temperatures which do not melt or burn the polymers may be used.

While water will generally be the preferred solvent, due to the economy, ease of handling and safety involved in using water, alternatively organic solvents may be employed. The aforementioned acrylic copolymers are soluble in, for example, t-butyl alcohol, diacetone alcohol, diethylene glycol, ethanol, isopropanol and methanol. Polyethylenimine and the aforementioned hydrophilic polyethylenimine derivatives and the higher polyalkylenepolyamines and derivatives, aside from being soluble in water, are generally soluble in the following organic solvents: methanol, ethanol, propylene glycol, glycerine, ethylene glycol and triethylene glycol.

In this regard, the water-dispersible or soluble hydrophilic acrylic copolymers used in accordance with this invention are easier and safer to apply than coatings known to the art, e.g., those based on hydroxyalkyl acrylates or methacrylates, which are applied from a non-aqueous solvent system. Specifically, ethanol is widely used as a solvent for these systems but the solvent is hazardous so that workers are forced to wear face masks and respirators, especially during warm weather.

When an organic solvent is used, the amount is preferably less than about 35% by weight of the aqueous solution or dispersion. The preferred solvent additives are ethanol and isopropanol. Addition of a solvent to the aqueous solution or dispersion permits the coating to dry rapidly, within 45–60 minutes, and materially reduce time in dry dock or "down time".

"Hard-surface" anti-fouling paint, as used in the specification and claims, means any anti-fouling paint composition which dries to a hard, shiny surface, and which does not tend to chalk, rub off, or absorb water. That is, the precoating material used in conjunction with the overcoating compositions of this invention should not be hydrophilic or water-swellable. Marine paints which satisfy these criteria and are suitable as the precoating paint contain a film-forming base, typical examples of which include drying and semi-drying oils, e.g., linseed oil, soya bean oil, oitica oil, dehydrated castor oil and the like; pure and mixed esters derived from dihydric and polyhydric alcohols and acids of drying or semi-drying oils, e.g., ethylene glycol, glycerol, pentaerythritol, mannitol, or propylene glycol esters of linoleic acid, oleic acid, ricinoleic acid, and the like; resins modified by drying or semi-drying oil, e.g., modified alkyd resins prepared by esterification of glycerol and phthalic anhydride and drying or semi-drying oil fatty acids; modified phenolic resins, such as those from reaction between the various cresols, formaldehyde and various drying or semi-drying oils; gum rosin and modified rosin-based resins, such as those obtained by esterifying rosin, glycerol or pentaerythritol and drying and/or semi-drying oil fatty acids; latex emulsions, e.g., butadiene-styrene copolymer emulsions, butadiene-acrylonitrile copolymer emulsions; vinyl polymers, e.g., vinyl chloride-vinyl acetate-vinyl alcohol copolymers and the like.

Typical of commercially available products which can be used as precoating materials are Interlux ®, a product of International Paint Co.; Vinylast, produced by Woolsey Paint Co.; and Vinyltex, obtainable from Baltimore Paint and Copper Co.

"Leaching-type" anti-fouling agents, suitable for the precoating paint base, are of the types indicated above, that is mercuric oxide; organocopper, organolead and organotin compounds; chlorinated aromatic hydrocarbons; nitrated aromatic hydrocarbons; and the like. Materials which are not recommended for use in combination with the overcoating compositions of this invention include soft copper and bronze formulations, which tend to depend on scaling, erosion or sloughing off of the anti-foulant to release the active material; and tar-based combinations, such as typical creosote formulations, to which the compositions of this invention do not adhere.

It will be understood that the precoating materials used in the practice of this invention also generally contain pigments, e.g., titanium dioxide, clay, carbon black, calcium carbonate, diatomaceous earth, bentonite, etc., as well as volatile solvents commonly used in the art, e.g, turpentine, xylene, toluene, etc. Thinners, e.g., mineral spirits; plasticizers, e.g., tricresyl phosphate; metallic driers, e.g., manganese, lead, cobalt, calcium, and iron naphthenates, oleates, linoleates and octoates may also be present in these formulations.

The method of this invention consists of reducing the fouling tendency of watercraft and stationary underwater structures precoated with hard-surface leaching-type anti-fouling paint by applying below the waterline of the watercraft or underwater structure an anti-fouling overcoating composition consisting essentially of an aqueous solution or dispersion of a carboxylated hydrophilic acrylic polymer, a cross-linking agent for the carboxylated hydrophilic acrylic polymer, a higher polyalkylenepolyamine or a hydrophilic derivative thereof and an effective amount of an ultraviolet-absorbing agent, as set forth above.

Preferably, the coating is applied to watercraft when new or when they are removed to a dry dock for renovation. Similarly boilers, tanks and other constructions can be coated before being put into service or during a scheduled maintenance shutdown. In this case, the preferred method of this invention is to apply the coating to a surface which has been pre-wetted with water and permit the coating to dry in air.

In another embodiment, this invention consists of a watercraft or stationary marine structure overcoated with the composition of this invention, as set forth above.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in anyway whatsoever. In the following Examples, the temperatures are set forth uncorrected in degrees Celsius; unless otherwise indicated, all parts and percentages are by volume.

EXAMPLE 1

An overcoating composition was prepared by mixing together 54.2 parts by weight of a terpolymer (56 parts by weight of methyl methacrylate, 30 parts of ethyl methacrylate and 14 parts of acrylic acid; molecular weight 30,000; 70% solution by weight in isopropanol); 3.4 parts by weight of aqueous ammonium hydroxide solution (28% by weight); 88.2 parts by weight of polyethylenimine (PEI 600, molecular weight 40,000–60,000; 40% by weight solution in water); 3.5% by weight of 2-ethyoxyethyl p-methoxycinnamate (Giv-tan ® F): and 254.2 parts by weight of deionized water. Just before use, glycerine triglycidyl ester (Epon ® 812) was added at a rate of 1.25 ounce per gallon of solution.

The solution was brushed on a wood hull of a 85-foot boat in drydock, precoated with a vinyl tape hard-surface paint containing a leaching-type anti-foulant (Woolsey Paint Co., Vinylast), from the waterline downward and permitted to dry in the air.

The craft, in subsequent operation, consumed less fuel than before the treatment and repelled all variety of underwater growth for more than two years according to tests.

EXAMPLE 2

An overcoating composition, made according to Example 1, except that bisphenol A diglycidyl ether (Epon ® 828) was used, applied according to Example 1. The craft so treated exhibited the improvement in fuel consumption and repulsion of underwater growth noted in Example 1.

EXAMPLE 3

A dispersion was obtained from 40 parts by weight of a terpolymer (44 parts by weight of butyl acrylate, 40 parts of methyl acrylate and 14 parts of acrylic acid; molecular weight 16,000; 30% solution in ammonia water, pH 7.5; 2 parts of zinc ammonium carbonate complex (obtained by dissolving 7.2 parts by weight of ZnO and 12.7 parts by weight of ammonium carbonate in 71.4 parts by weight of water and then adding 8.7 parts by weight of concentrated ammonium hydroxide); 24 parts by weight of 2-ethoxyethyl p-methoxycinnamate; 90 parts by weight of aqueous ammonia solution (3% by weight of ammonia); 200 parts by weight of polyethylenimine (molecular weight 30,000–40,000; 40% solution by weight in water); and 300 parts by weight of deionized water.

Results obtained were similar to those of Examples 1 and 2.

EXAMPLE 4

A solution was prepared from 30 parts by weight of a copolymer obtained from 90 parts by weight of ethyl acrylate and 10 parts by weight of acrylic acid (30% by weight solution in aqueous ammonia; pH 7.5); 10 parts by weight of ammonium dichromate solution (30% by weight, 3% by weight of ammonia); 200 parts by weight of polyethylenimine (molecular weight 40,000–60,000; 40% solution by weight in water); 350 parts by weight of deionized water and 30 parts of 2-ethoxyethyl p-methoxycinnamate.

The solution was sprayed on a fiberglass hull of a drydocked pleasure craft precoated below the waterline with results similar to those obtained in Examples 1, 2 and 3.

EXAMPLE 5

A solution was prepared as in Example 4, except that 200 parts by weight of polyethylenimine was replaced by 200 parts by weight of ethoxylated PEI (PEK 600E, Southwest Specialty Chemicals, Inc., 37% solids, molecular weight 40,000–60,000). The material thus prepared has outstanding storage stability and otherwise behaves as in Examples 1–4.

EXAMPLE 6

A dispersion is obtained as in Example 3, except that 100 parts by weight of PEI is replaced by 100 parts by weight of ethoxylated PEI. Results are as in the foregoing examples.

EXAMPLE 7

A water boiler, the surface of which is prepared by sand blasting, is coated with a composition of Example 1 from which the 2-ethoxyethyl-p-methoxycinnamate is omitted. The thus coated boiler corrodes to an extent considerably less than an uncoated control.

EXAMPLE 8

The following dispersions were prepared, prior to addition of a cross-linking agent as in the foregoing Examples:

| | Parts by volme | | | | | | |
|---|---|---|---|---|---|---|---|
| water | 42 | 44 | 63 | 63 | 37.4 | 55.3 | 37 |

-continued

| | Parts by volume | | | | | | |
|---|---|---|---|---|---|---|---|
| conc. NH₄OH | 4 | 4 | 3 | 13 | 31 | 31 | 4 |
| terpolymer of Example 1 | 13 | 14 | 16 | 16 | 12.5 | 18.6 | 13 |
| isopropanol | 26 | 27 | | | 25.7 | | 25 |
| PEI 600 (40.5% real) | 15 | | | | | | |
| Polymin P (52.3% real) | | 10 | | 7 | | | |
| PEI 600E (37% real) | | | 16 | | | | 19 |
| P-1000 (31.9% real) | | | | | 20 | 22 | |
| 2-ethoxyethyl p-methoxycinnamate | 1 | 1 | 1 | 1 | 1 | 1 | 2 |
| % solids | 15.3 | 15.5 | 19.6 | 14.5 | 15.8 | 18.8 | |
| pH | 9.8 | 10.4 | 10.0 | 10.7 | 10.0 | 10.2 | |

The cross-linking agent is Epon® 812 or 828, at a level of 1.5 ounces per gallon of dispersion.

The preceding can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method of reducing the fouling tendency of watercraft and stationary underwater structures consisting of applying below the water line of the watercraft or underwater structure a hard-surface leaching-type anti-fouling paint, drying the anti-fouling paint, overcoating the dried paint with an outer coating composition consisting essentially of an aqueous solution or dispersion of a carboxylated hydrophilic acrylic copolymer, a cross-linking agent for the carboxylated hydrophilic acrylic copolymer, a higher polyalkylenepolyamine or a hydrophilic higher polyalkylenepolyamine derivative and an effective amount of an ultraviolet-absorbing agent, and drying the outer coating composition over the paint.

2. The method of claim 1, wherein the watercraft or underwater structure is pre-wetted with water prior to application of the anti-fouling composition.

3. The method of claim 1, wherein the effective amount of the ultraviolet-absorbing agent is from about 0.5% to about 5% by weight of the aqueous solution or dispersion.

4. The method of claim 1, wherein the ultraviolet-absorbing agent absorbs from about 2700 Å to about 3300 Å.

5. The method of claim 1, wherein the carboxylated hydrophilic acrylic copolymer and the higher polyalkylenepolyamine or hydrophilic higher polyalkylenepolyamine derivative constitute from about 5% to about 50% by weight of the solution or dispersion.

6. The method of claim 1, wherein the cross-linking agent constituted from about 0.1% to about 2.5% by weight of the aqueous solution or dispersion.

7. The method of claim 1, wherein the ratio of higher polyalkylenepolyamine or hydrophilic higher polyalkylenepolyamine derivative to the carboxylated hydrophilic acrylic polymer is from about 10:1 to about 0.5:1.

8. The method of claim 1, wherein the ultraviolet-absorbing agent is 2-ethoxyethyl p-methoxycinnamate.

9. The method of claim 1, wherein the aqueous solution or dispersion contains up to 35% of an organic solvent.

10. A marine structure protected against fouling by marine organisms consisting of a watercraft or a stationary marine structure coated below the waterline with a hard-surface leaching-type anti-fouling paint and overcoated with an anti-fouling composition consisting essentially of an aqueous solution or dispersion of an carboxylated hydrophilic acrylic copolymer, a cross-linking agent for the carboxylated hydrophilic acrylic copolymer, a higher polyalkylenepolyamine or a hydrophilic higher polyalkylenepolyamine derivative and an amount of from about 0.5% to about 5% by weight of said aqueous solution or dispersion of an ultraviolet-absorbing agent.

11. The structure of claim 10, wherein the ultraviolet-absorbing agent absorbs from about 2700 Å to about 3300 Å.

12. The structure of claim 10, wherein the carboxylated hydrophilic acrylic polymer and the higher polyalkylenepolyamine or hydrophilic higher polyalkylenepolyamine derivative constitute from about 5% to about 50% by weight of the solution or dispersion.

13. The structure of claim 10, wherein the cross-linking agent constitutes from about 0.1% to about 2.5% by weight of the aqueous solution or dispersion.

14. The structure of claim 10, wherein the ratio of higher polyalkylenepolyamine or hydrophilic higher polyalkylenepolyamine derivative to the carboxylated hydrophilic acrylic copolymer is from about 10:1 to about 0.5:1.

15. The structure of claim 10, wherein the ultraviolet-absorbing agent is 2-ethoxyethyl-p-methoxycinnamate.

16. A method of reducing the fouling tendency of watercraft and stationary underwater structures consisting of applying below the waterline of the watercraft or underwater structure a hard-surface leaching-type anti-fouling paint, drying the anti-fouling paint, overcoating the dried paint with an outer coating composition consisting essentially of an aqueous solution or dispersion of a carboxylated hydrophilic acrylic copolymer, a cross-linking agent for the carboxylated hydrophilic acrylic copolymer, polyethylenimine and an effective amount of an ultraviolet-absorbing agent, and drying the outer coating composition over the paint.

17. A method of reducing the fouling tendency of watercraft and stationary underwater structures consisting of applying below the waterline of the watercraft or underwater structure a hard-surface leaching-type anti-fouling paint, drying the anti-fouling paint, overcoating the dried paint with an outer coating composition consisting essentially of an aqueous solution or dispersion of a carboxylated hydrophilic acrylic copolymer, a cross-linking agent for the carboxylated hydrophilic acrylic copolymer, an ethoxylated polyethylenimine and an effective amount of an ultraviolet-absorbing agent, and drying the outer coating composition over the paint.

18. A marine structure protected against fouling by marine organisms consisting of a watercraft or a stationary marine structure coated below the waterline with a hard-surface leaching-type anti-fouling paint and overcoated with an anti-fouling composition consisting essentially of an aqueous solution or dispersion of a carboxylated hydrophilic acrylic copolymer, a cross-linking agent for the carboxylated hydrophilic acrylic copolymer, an ethoxylated polyethylenimine and an amount of from about 0.5% to about 5% by weight of said aqueous solution or dispersion of an ultraviolet-absorbing agent.

19. A method of reducing the fouling tendency of watercraft and stationary underwater structures consisting of applying below the waterline of the watercraft or underwater structure a hard-surface leaching-type anti-fouling paint, drying the anti-fouling paint, overcoating the dried paint with an outer coating composition consisting essentially of an aqueous solution or dispersion of a carboxylated hydrophilic acrylic copolymer, a cross-linking agent for the carboxylated hydrophilic acrylic copolymer, a urea-modified polyethylenimine and an effective amount of an ultraviolet-absorbing agent, and drying the outer coating composition over the paint.

20. A marine structure protected against fouling by marine organisms consisting of a watercraft or a stationary marine structure coated below the waterline with a hard-surface leaching-type anti-fouling paint and overcoated with an anti-fouling composition consisting essentially of an aqueous solution or dispersion of a carboxylated hydrophilic acrylic copolymer, a cross-linking agent for the carboxylated hydrophilic acrylic copolymer, a urea-modified polyethylenimine and an amount of from about 0.5% to about 5% by weight of said aqueous solution or dispersion of an ultraviolet-absorbing agent.

* * * * *